(12) United States Patent
Straw et al.

(10) Patent No.: US 8,219,918 B2
(45) Date of Patent: Jul. 10, 2012

(54) DISPLAYING MULTIPLE STORAGE WINDOWS

(75) Inventors: David Straw, Loveland, CO (US); Peter M. Maddocks, Windsor, CO (US); Matt Zinkevicius, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 877 days.

(21) Appl. No.: 11/796,666

(22) Filed: Apr. 27, 2007

(65) Prior Publication Data

US 2008/0270933 A1 Oct. 30, 2008

(51) Int. Cl.
*G06F 15/177* (2006.01)
*G06F 3/048* (2006.01)

(52) U.S. Cl. .................. 715/736; 715/772; 715/781

(58) Field of Classification Search .............. 707/204, 707/205; 709/224; 715/736, 772, 781; 711/111, 711/114

See application file for complete search history.

(56) References Cited

U.S. PATENT DOCUMENTS

| 5,345,550 | A | * | 9/1994 | Bloomfield | 715/841 |
| 5,572,649 | A | * | 11/1996 | Elliott et al. | 715/788 |
| 6,606,658 | B1 | * | 8/2003 | Uematsu | 709/224 |
| 6,628,205 | B2 | * | 9/2003 | Aguren et al. | 340/815.4 |
| 7,031,988 | B2 | * | 4/2006 | Kusama et al. | 707/205 |
| 7,322,010 | B1 | * | 1/2008 | Mikula | 715/734 |
| 7,555,719 | B1 | * | 6/2009 | Yehuda et al. | 715/736 |
| 7,587,568 | B2 | * | 9/2009 | Muthulingam et al. | 711/165 |
| 2002/0180795 | A1 | * | 12/2002 | Wright | 345/772 |
| 2005/0165803 | A1 | * | 7/2005 | Chopra et al. | 707/100 |
| 2006/0095664 | A1 | * | 5/2006 | Wichelman et al. | 711/114 |
| 2007/0150562 | A1 | * | 6/2007 | Stull et al. | 709/223 |
| 2007/0266136 | A1 | * | 11/2007 | Esfahany et al. | 709/223 |
| 2008/0155208 | A1 | * | 6/2008 | Hiltgen et al. | 711/154 |
| 2008/0282189 | A1 | * | 11/2008 | Hofmann et al. | 715/793 |

* cited by examiner

*Primary Examiner* — Weilun Lo
*Assistant Examiner* — Truc Chuong

(57) ABSTRACT

Various embodiments are disclosed for displaying multiple storage windows. One embodiment is a method that displays a first window having a depiction of storage capacity. The first window is expanded to nest two storage windows in the first window.

18 Claims, 4 Drawing Sheets

DISPLAYING MULTIPLE STORAGE WINDOWS

BACKGROUND

Various techniques are used to display content of storage devices. As one example, tables display visual representations of a relatively large amounts of information provided in cells across multiple columns and rows. This information, however, can be difficult to quickly discern. Further, large tables can utilize much space on a display. As another example, storage trees provide a simple representation of information that is quickly to discern. Information presented in trees provides relatively limited detail.

Users can benefit from a graphical user interface that displays data so relevant information is easily and quickly discernable.

DETAILED DESCRIPTION

Exemplary embodiments are directed to systems, methods, and apparatus for providing a graphical portion of a graphical user interface (GUI) that is both expandable and nested. One embodiment provides a GUI that displays data so a user can easily and quickly discern relevant information, such as storage capacity or unused storage space.

In one embodiment, storage information is presented in plural nested windows. A header at the top of a window represents storage capacity in a clear and easy-to-understand way. Because useful information about a storage block is visually represented, less text is required to convey this information to a user. The visual representation provides a way to quickly see how full a storage block is and how large it is compared to other storage blocks.

Multiple windows can be nested within each other and simultaneously displayed to a user. Nesting allows for a visual representation of any number of layers in a storage stack. These layers can be anything that a developer defines them to be, including physical devices and abstract concepts. Storage stacks can include many layers to which a user can navigate by expanding a window or drilling down. On top of the storage stack, a developer can define abstract concepts of a storage block, such as MP3 files, SQL (structured query language) Server data, etc.

Figure 1:
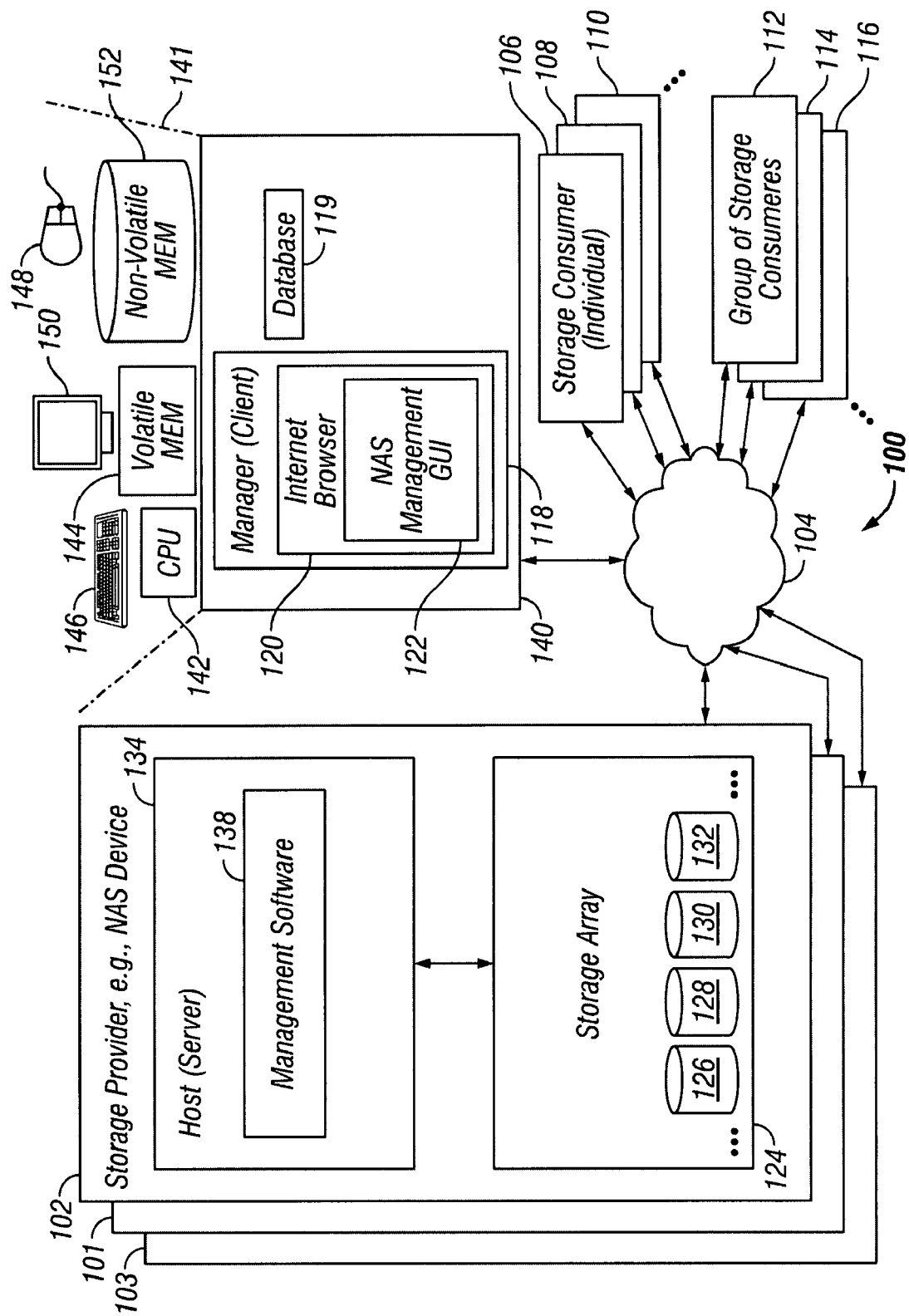
FIG. 1 illustrates a storage domain in accordance with an exemplary embodiment.

These embodiments are utilized with various systems and apparatus. FIG. 1 illustrates an exemplary embodiment as a system 100 for generating visualizations displayed to a user. By way of example, the system 100 is shown as a distributed system, such as a storage domain that provides a GUI.

Components of the storage domain 100 include one or more of the following: storage providers 102 (and optionally, 101, 103, etc.) of storage capacity; a manager 118 of a network attached storage device or NAS-device 102 (hereafter, the "NAS-manager 118"); various individual consumers of storage 106, 108, 110, etc.; various groups of storage consumers 112, 114, 116, etc.; and one or more networks 104, such as networking protocol and/or architecture (NPA) 104 through which the components 102, 106-118 can communicate. In one embodiment, a storage provider 102 is a network-attached storage (NAS) device.

The storage-consumers 106-116 are consumers in the sense that they consume storage capacity made available to them through the storage domain 100. The storage providers 101-103 are providers of storage capacity to the storage domain 100. Particular collections of storage-domain components vary according to circumstances in which the storage-domain is assembled and evolves. Thus, the storage domain 100 can include additional storage consumers and/or additional providers of storage.

In general operation of the storage domain 100, the storage consumers 106-116 are allotted respective amounts of storage capacity (made available by the storage providers 101-103) on the storage-domain 100. The provisioning, allotment, management, and control over (including access to) the storage capacity is performed via the NAS-manager 118. Also, where permitted by the NAS-manager 118, the storage consumers 106-116 can conduct writes/reads directly (in the sense of not needing the involvement of the NAS-manager 118) to/from the NAS-device 102 via the NPA 104.

The NAS-manager 118 makes use of a GUI according to an embodiment of the invention, thus making the NAS-manager 118 another embodiment. A graphical portion of such a GUI enhances the ability of a user to manage the storage made available by the NAS-device 102 and various storage-domain components.

In one embodiment, the NAS-manager 118 is an application loaded on a host 140 that is connected to the NPA 104. In general, a host is a computer that can provide/receive data and/or services via an NPA, such as network 104. Exemplary components found in the host 140 include (shown between dashed lines 141): a central processing unit (CPU) 142; volatile memory 144; non-volatile memory 152 (example, storing one or more algorithms of exemplary embodiments); a keyboard 146; a pointing device, e.g., a mouse, 148; and a monitor 150.

Embodiments in accordance with the present invention are not limited to any particular type or number of storage devices and/or host computers. The host computer for example, includes various portable and non-portable computers and/or electronic devices. Exemplary host computers include, but are not limited to, computers (portable and non-portable), servers, main frame computers, distributed computing devices, laptops, and other electronic devices and systems whether such devices and systems are portable or non-portable.

The NAS manager 118 generates a GUI 122 based upon the GUI according to various embodiments. Further, the NAS device 102 can include a host 134 and a storage array 124 of various individual storage units 126-132, etc., example, hard disk drives. The NAS host 134 can include components similar to those of the host 140. Management software 138, which interacts with the NAS-manager 118, can be loaded on the host 134. The NAS-manager 118 and the host/management software 134/138 can be based upon a client-server architecture, respectively.

Exemplary embodiments can be utilized with storage domains having multiple file systems on which multiple users/groups have allocated storage space. Windows correspond to file systems of the storage domain and nested windows correspond to instances of the files systems and/or the space allotments within the file systems.

Figure 2:
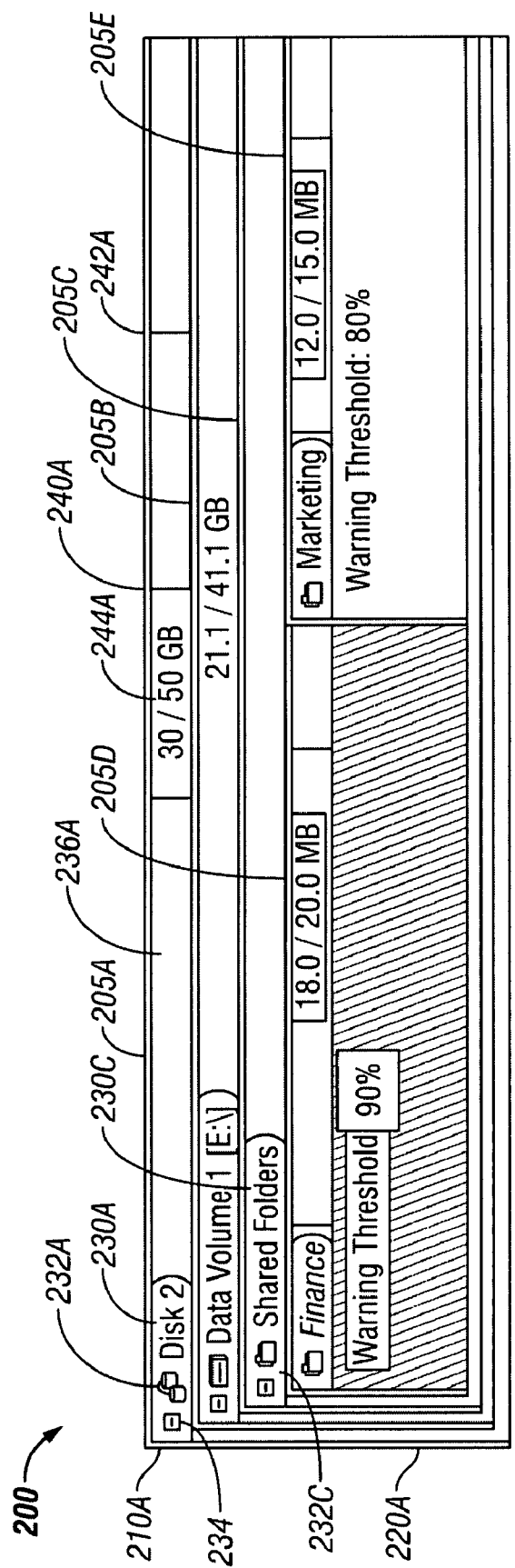
FIG. 2 illustrates a graphical portion of a graphical user interface in accordance with an exemplary embodiment.

FIG. 2 depicts a storage block or graphical portion 200 of a graphical user interface (GUI) according to an embodiment (example, used in the context of a storage domain 100). The graphical portion 200 is presented or depicted to a user, example on a display screen (such as 150 in FIG. 1) and includes a plurality of nested windows that are expandable and collapsible.

For discussion, the graphical portion 200 is presented in the context of a storage-domain having exemplary storage-domain components, attributes, labels, values, etc. It should be understood that such components, attributes, labels, and values will differ depending upon the circumstances in which use of the present GUI arises.

In one embodiment, a database 119 (such as an SQL database loaded on the host) maintains information about the storage-domain 100 and the various storage-domain components. The windows are represented in the database 119, or alternatively in the NAS-manager 118, data objects corresponding to the storage-domain 100 and the various storage-domain components.

As shown in FIG. 2, the graphical portion 200 includes a plurality of windows 205A-205E. Multiple smaller windows 205B-205E are nested inside of a relatively larger window 205A.

In one embodiment, one or more of the windows include a header portion and a body portion. By way of example, window 205A includes a header 210A and a body 220A. The header 210A includes a title 230A, an icon 232A, an expand/collapse button 234A, and a graphical storage capacity indication 236A. The title 230A provides the title of the storage block (such as Disk 2 which is a storage device), and the icon 232A provides a pictorial or graphical illustration of what the storage block is. The icon clarifies the purpose, function, or definition of the storage block. For instance, icon 232A is a picture of disk storage to represent title 230A (Disk 2); icon 232C is a picture of folders to represent title 230C (Shared Folders).

The title and icon are used to quickly tell the user what this block of storage represents. By way of example, the block of storage is a physical device (such as a storage device), an application, or an abstract concept, such as MP3 files.

The expand/collapse buttons are provided to expand or collapse a window when activated or clicked by a user. When a window is expanded, one or more other windows can be generated and nested inside a body of the expanded window. In one embodiment, this button provides a (+) if the window is currently collapsed and provides a minus sign (−) if the window is currently expanded.

The capacity bar 236A visually instructs the user as to various storage or capacity information such as, but not limited to, storage used, storage available, total storage capacity, etc. The bar also includes one or more predetermined thresholds to visually warn the user when storage meets or exceeds a threshold. For example, if the actual storage usage exceeds a percentage of available usage, then provide a visual or audio warning to the user. By way of example, a colored or flashing icon is presented on the display to visually notify a user that a storage capacity limit or threshold is exceeded.

In one embodiment, the size or length and/or width of the bar are used to visually depict storage capacity. For example, the length of the bar represents total available storage capacity. As storage is used, visual indications in the bar enable the user to see the amount of storage currently used.

In one embodiment, each bar uses one or more of color, shading, lines, graphics, indicia, or other visual markings to notify the user of storage usage or capacity. For example, storage bar 236A includes an actual usage line 240A that indicates an amount of storage being used. As more storage is used in Disk 2, the bar fills and the usage line 240A moves to indicate an amount or percentage of storage usage. By way of illustration, if fifty percent of the storage capacity is used, then the usage line 240A would be in the middle of the bar.

In one embodiment, each bar uses a warning threshold line 242A to visually indicate how close the actual usage is to a predetermined threshold. Thresholds can be set at any user-defined location, such as seventy-five percent, eighty percent, etc.

In one embodiment, each bar also includes a numerical or textual indication 244A of storage capacity or usage. This information can correspond to or be different than the visual information presented in the capacity bar. By way of example, storage indication 244A shows that the total storage capacity to be 50 gigabytes (GB) with 30 GB being used.

Thus, in one embodiment, the storage size used is represented as the amount of the bar that is filled (example, using a color, pattern, shading, etc.). The size of remaining or free storage is represented as the rest of the bar (example, portion of the bar not filled). The total size and used size are also displayed in text or numbers over the bar in appropriate storage units (example, bytes, kilobytes, megabytes, etc.). The warning threshold is represented as a thin vertical bar drawn over the capacity bar.

The body of each bar can be used to provide additional information. For instance, the body 220A of window 205A includes a plurality of nested windows that were expanded. The window can be sub-components that are associated with window 205A. For instance, window 205B represents a data volume (example, logical disk E:\) of Disk 2. By way of further example, windows 205D and 205E represent folders or files located in Data Volume 1 E:\.

Windows can be nested as much as desired. For instance, a storage stack can be represented all the way from the physical hard drives to the volumes if desired. Other useful information or data can be placed in the body like a list of detailed information about the storage block, warnings, and tables and/or graphical information (example, see FIG. 4), to name a few examples. By way of illustration, window 205D (shown as a finance folder) includes a warning (Warning Threshold: 90%) since ninety percent (i.e., 18.0/20.0 MB) of storage space is being utilized. Window 205E also includes a warning since 80% of its storage is being used.

Figure 3:
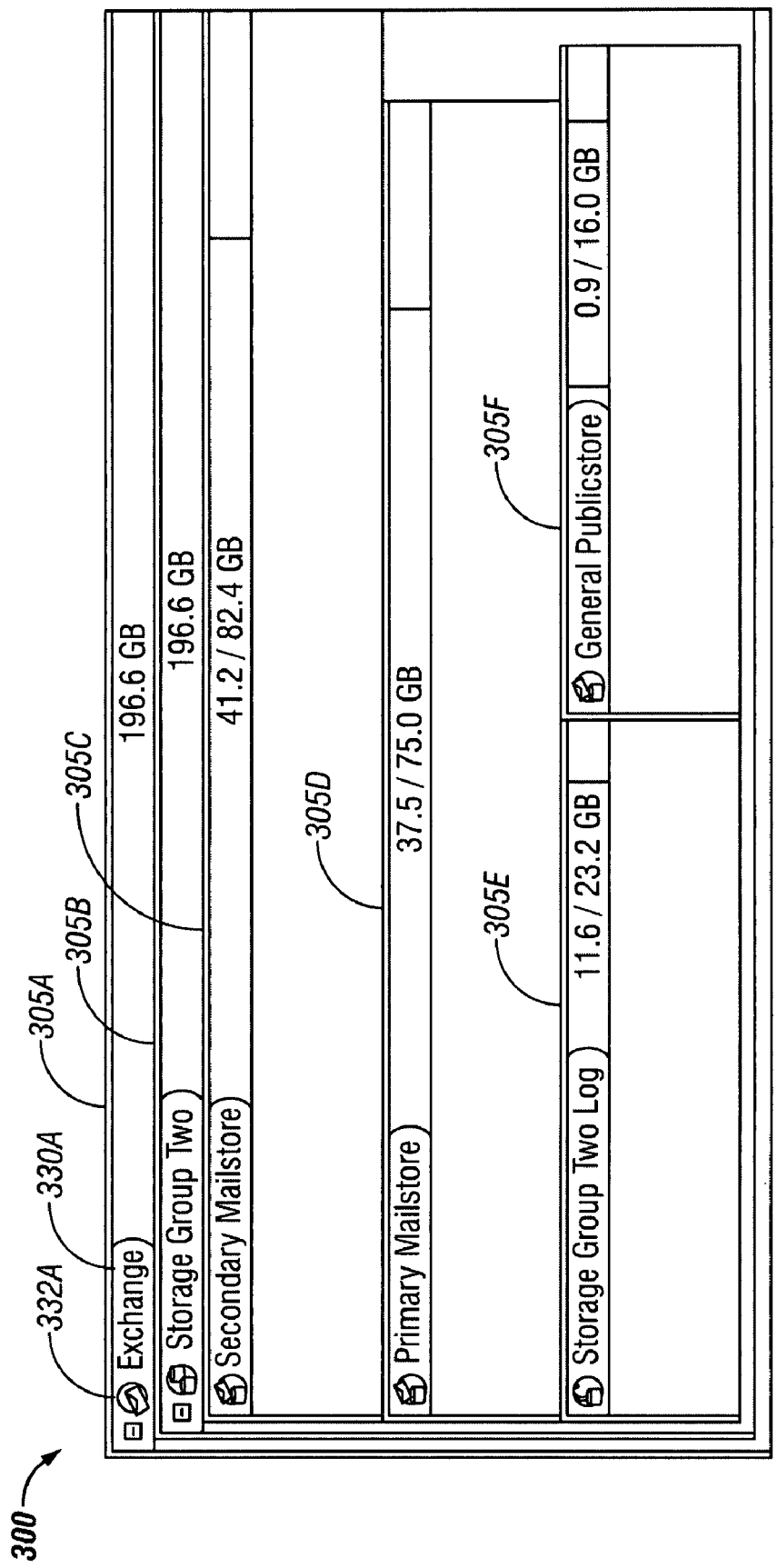
FIG. 3 illustrates another graphical portion of a graphical user interface in accordance with an exemplary embodiment.

FIG. 3 shows another example of a graphical portion 300 using a plurality of nested and expanded windows 305A-305F used to represent storage information to a user. Graphical portion 300 includes many of the features discussed in connection with graphical portion 200 of FIG. 2. As one difference, graphical portion 300 is directed to storage information for an application (shown as title 330A: Exchange). A corresponding icon 332A depicts the application as a mail application having a variety of storage groups (shown with titles and corresponding icons).

Figure 4:
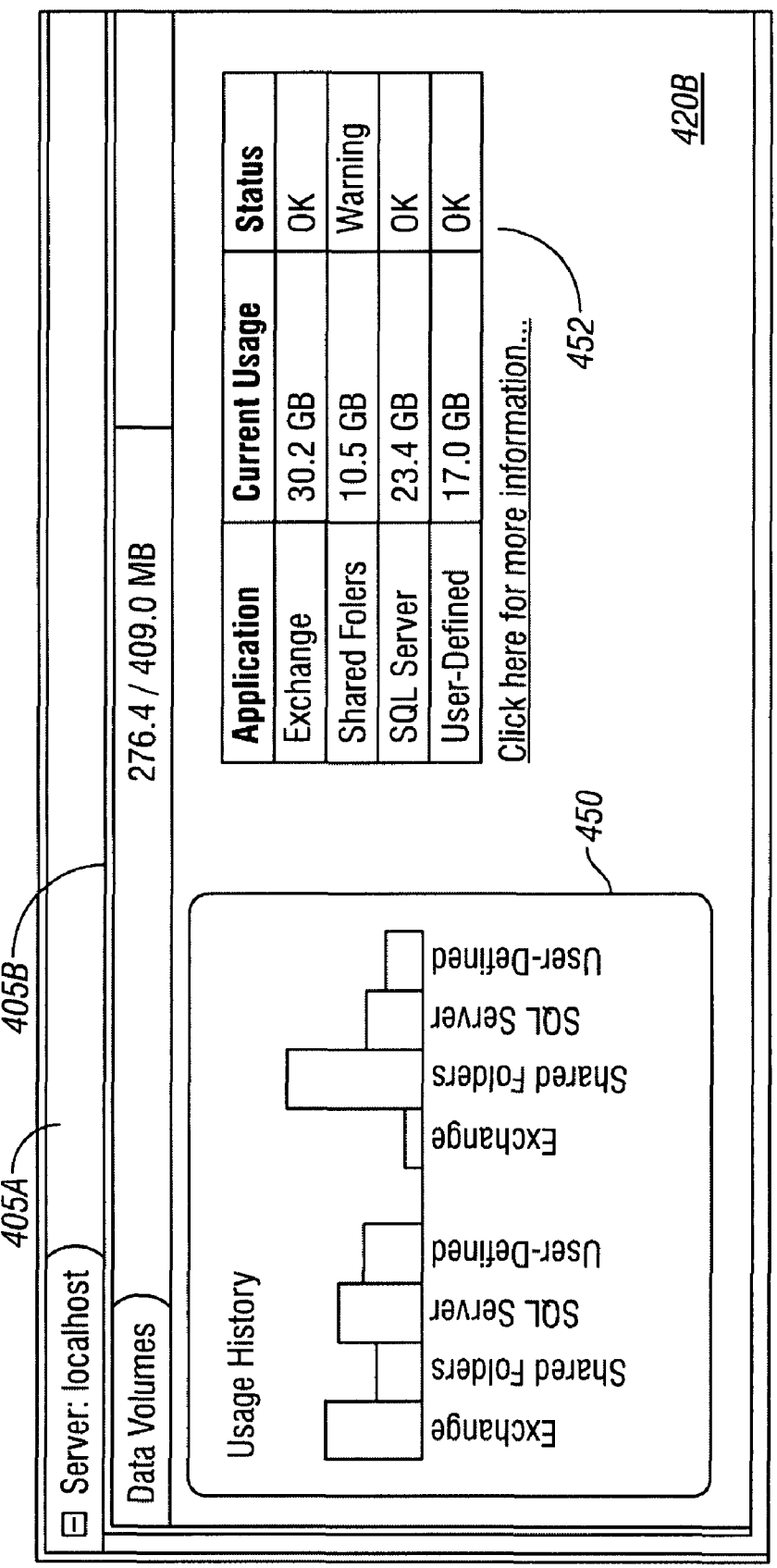
FIG. 4 illustrates yet another graphical portion of a graphical user interface in accordance with an exemplary embodiment.

As noted, various types of information can be placed in the body of a nested window. FIG. 4 shows a primary window 405A for a server (title: Server: localhost). Window 405A includes a nested window 405B that represented data volumes of the server. The window 405B has a body portion 420B that includes plural graphical illustrations (shown as usage history 450 and table 452). The usage history 450 utilizes plural bar charts to show storage usage over time for various applications and storage devices. The table 452 has three columns: application (listing various applications), current usage (listing storage usage for each respective application), and status (indicating whether the respective application has surpassed a storage usage limit).

In one embodiment, the windows provide the ability to group storage of individual applications whose storage is hosted on the storage system. The application storage is broken into one or more layers. As such, a user can select to view some of the underlying storage stack not currently being displayed. Further, since the windows can represent any abstract concept of a storage block, they have a variety of uses. Further, the ability to nest windows enables a developer to apply it to as many or as few layers of abstraction as desired. The fact that a window can be expanded and collapsed allows for drilling down into whichever data the user is interested in viewing. The easy-to understand visual representation of the storage capacity gives a user a high level view of how storage is allocated between devices, applications, etc.

In one embodiment, information presented in the windows is interactive. For example, when a user clicks or activates an icon, value, or item of the display, the user is provided with additional information. For instance, a pull-down menu automatically appears on the display, a new window appears, the user is navigated to supplemental information, etc. Such interactions with the user also include drilling down to receive additional information. The term "drilldown" or "drill down" (or variations thereof) is used when referring to moving down through a hierarchy of folders and/or files in a file system. The term may also mean clicking, selecting, and/or navigating through a series of dropdown menus or graphical illustrations in a graphical user interface. Drilldown layers, for example, allow the user to explore the graphical illustration in a hierarchical manner by pointing, clicking, and/or selecting on the part of the graphical illustration where more detail is desired.

As used herein, the term "storage device" means any data storage device capable of storing data including, but not limited to, one or more of a disk array, a disk drive, a tape drive, optical drive, a SCSI device, or a fiber channel device. As used herein, a "disk array" or "array" is a storage system that includes plural disk drive, a cache, and controller. Arrays include, but are not limited to, networked attached storage (NAS) arrays, modular SAN arrays, monolithic SAN arrays, utility SAN arrays, and storage virtualization.

In the various embodiments in accordance with the present invention, embodiments are implemented as a method, system, and/or apparatus. As one example, exemplary embodiments and steps associated therewith are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method executed by a computer, comprising:
    displaying, with the computer, a first window including a bar that extends across a top of the first window and that depicts storage capacity;
    expanding, with the computer, the first window to simultaneously display two windows that are nested as layers inside a body of the first window, each of the two windows including a body that displays storage information and a header located at a top portion of the two windows, the header of each of the two windows including a bar depicting storage capacity;
    displaying in a header of the first window and in the header of the two windows a textual indication depicting the corresponding storage capacity and a warning when a threshold storage capacity is exceeded; and
    simultaneously displaying warning storage thresholds in the bodies of the two windows.

2. The method of claim 1 further comprising, clicking on a button in a corner of the first window to nest the two windows inside the body of the first window.

3. The method of claim 1 further comprising, displaying in the bar of the first window an amount of used storage space and an amount of unused storage space, wherein the bar is located in the header across the top of the first window and the header of the first window includes a title for a storage device.

4. The method of claim 1 further comprising, filling the header of the first window and the header in the two windows an amount to visually indicate a size of remaining free storage.

5. The method of claim 1 further comprising, expanding one of the two windows to generate a fourth window nested inside the one of the two windows.

6. The method of claim 1 further comprising, displaying in a top portion of the first window a button to expand the first window, a title of the first window, and the bar depicting storage capacity for the first window.

7. A physical media storing software programming code that is executed by a computer to perform a method, comprising:
    displaying a first window including a bar that extends across a top of the first window and that depicts a storage capacity of a storage device;
    nesting a second window inside the first window, the second window showing a storage capacity of a first portion of the storage device;
    nesting a third window inside the second window, the third window showing a storage capacity of a second portion of the storage device, wherein the second and third windows are nested as layers in the first window, wherein each of the second and third windows graphically displays an amount of used storage space and an amount of available storage space, wherein the first, second, and third window have headers each containing a textual indication to depict the corresponding storage capacity and a warning when a threshold capacity is exceeded; and
    simultaneously displaying warning storage thresholds in bodies of the second and third windows.

8. The physical media of claim 7, wherein the second window shows the storage capacity of the first layer in the header of the second window, and the third window shows the storage capacity of the second layer in the header of the third window.

9. The physical media of claim 7, wherein the header of each of the first, second, and third windows further includes a title and an expand/collapse button.

10. The physical media of claim 7 wherein the software programming code is executable by the computer to move lines in the headers of the first, second, and third windows to indicate an amount of storage being used.

11. The physical media of claim 7 wherein the software programming code is executable by the computer to fill the header of each of the first, second, and third windows to visually indicate an amount of free storage available.

12. The physical media of claim 7 wherein the software programming code is executable by the computer to change a size or length of the header in each of the first, second, and third windows to visually depict storage capacity.

13. The physical media of claim 7 wherein the software programming code is executable by the computer to display a bar across the header in a top portion of each of the second and third windows, each bar using color to visually indicate an amount of available storage capacity.

14. A computer system, comprising:
memory for storing an algorithm; and
processor for executing the algorithm to:
display a first window having a graphical indication of storage usage for an application, the first window including a bar that extends across a top of the first window and that depicts storage capacity;
simultaneously display two windows nested as layers in the first window, wherein each of the two windows includes an icon representing a type of sub-component of the application and a header at a top portion of each of the two windows, the header including a graphical illustration that changes to indicate available storage capacity for the type of sub-component,
wherein a header of the first window and the headers of the two windows each includes a textual indication depicting the corresponding storage capacity and a warning when a threshold storage capacity is exceeded, and wherein warning storage thresholds are displayable in bodies of the two windows.

15. The computer system of claim 14, wherein the header of each of the two windows also includes a title and an expand/collapse button.

16. The computer system of claim 14, wherein the textual indication in the header of each of the two windows changes to indicate the available storage capacity for the type of sub-component.

17. The computer system of claim 14, wherein the processor further executes the algorithm to expand one of the two windows to generate a fourth window nested inside the one of the two windows.

18. The computer system of claim 14, wherein the processor further executes the algorithm to fill a header in a top portion of the first window to indicate an amount of storage being used.

* * * * *